US010674547B2

(12) United States Patent
Tabuki (10) Patent No.: US 10,674,547 B2
(45) Date of Patent: Jun. 2, 2020

(54) COMMUNICATION APPARATUS HAVING ACCESS POINT FUNCTION FOR OPERATING AS BASE UNIT FOR WIRELESS COMMUNICATION AND METHOD FOR CONTROLLING COMMUNICATION APPARATUS

(71) Applicant: CANON KABUSHIKI KAISHA, Tokyo (JP)

(72) Inventor: Masumi Tabuki, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 107 days.

(21) Appl. No.: 15/395,440

(22) Filed: Dec. 30, 2016

(65) Prior Publication Data

US 2017/0215215 A1   Jul. 27, 2017

(30) Foreign Application Priority Data

Jan. 21, 2016  (JP) ................. 2016-009918

(51) Int. Cl.
*H04W 76/02* (2009.01)
*H04W 76/11* (2018.01)
*H04W 76/14* (2018.01)
*H04W 76/18* (2018.01)
*H04W 76/19* (2018.01)
*H04W 8/00* (2009.01)

(52) U.S. Cl.
CPC ............ *H04W 76/11* (2018.02); *H04W 76/14* (2018.02); *H04W 8/005* (2013.01); *H04W 76/18* (2018.02); *H04W 76/19* (2018.02)

(58) Field of Classification Search
CPC ...... H04W 76/11; H04W 76/14; H04W 8/005; H04W 76/18; H04W 76/19
See application file for complete search history.

(56) References Cited

U.S. PATENT DOCUMENTS

| 2009/0009801 A1* | 1/2009 | Tabuki | G06K 15/02 358/1.15 |
| 2011/0009147 A1* | 1/2011 | Morita | H04J 11/0056 455/509 |
| 2012/0050796 A1* | 3/2012 | Yokokura | G06F 3/121 358/1.15 |
| 2013/0265935 A1* | 10/2013 | Matsuda | H04W 76/10 370/315 |
| 2017/0273123 A1* | 9/2017 | Crawley | H04W 48/12 |

FOREIGN PATENT DOCUMENTS

| JP | 2003174678 A | 6/2003 |
| JP | 2013-153452 A | 8/2013 |
| JP | 2013-219430 A | 10/2013 |

* cited by examiner

*Primary Examiner* — Lakeram Jangbahadur
(74) *Attorney, Agent, or Firm* — Canon U.S.A., Inc. I.P. Division (57) ABSTRACT

A communication apparatus including an access point function permits a designated terminal to wirelessly connect with the communication apparatus and inhibits a non-designated terminal from wirelessly connecting with the communication apparatus.

15 Claims, 9 Drawing Sheets

| NAME | ID | FINAL CONNECTION DATE |
|---|---|---|
| Mobile_1 | 00-11-22-33-44-55 | 2015-07-07 |
| Mobile_001122 | 00-11-22-66-77-88 | 2015-07-30 |
| Mobile_xx | 99-aa-bb-cc-dd-ee | 2015-07-30 |
| ⋮ | ⋮ | ⋮ |
| | | |

COMMUNICATION APPARATUS HAVING ACCESS POINT FUNCTION FOR OPERATING AS BASE UNIT FOR WIRELESS COMMUNICATION AND METHOD FOR CONTROLLING COMMUNICATION APPARATUS

BACKGROUND

Field

The present disclosure relates to a communication apparatus having an access point function for operating as a base unit for wireless communication.

Description of the Related Art

Image forming apparatuses that support a wireless function are known. The image forming apparatuses that support the wireless communication function can include a plurality of wireless communication systems. Japanese Patent Application Laid-Open No. 2013-153452 discusses an apparatus including an infrastructure mode for performing wireless communication using a wireless access point and an ad hoc mode for directly performing wireless communication between apparatuses without using a wireless access point. Japanese Patent Application Laid-Open No. 2013-219430 discusses performing wireless communication where wireless communication is distinguished between a connection using a wireless access point and a connection without using a wireless access point.

If an access point function (AP function) for directly performing wireless communication between apparatuses without using a wireless access point is used, the image forming apparatus wirelessly broadcasts a service set identifier (SSID) serving as a wireless identifier. A portable terminal searching for a connectable image forming apparatus connects to a wireless network provided by the AP function of the image forming apparatus through a procedure for searching for an SSID issued by the image forming apparatus and establishing a wireless connection.

When a plurality of connectable portable terminals exist around an image forming apparatus, the plurality of portable terminals can wirelessly connect to the image forming apparatus before a user's portable terminal connects to the image forming apparatus. If the number of portable terminals wirelessly connecting to the image forming apparatus prior to the user's portable terminal is large, the upper limit of number of connections to the image forming apparatus can be met before the user's portable terminal wirelessly connects to the image forming apparatus. When the upper limit is met, the user's portable terminal cannot wirelessly connect to the image forming apparatus.

SUMMARY

According to an aspect of an embodiment, a communication apparatus including an access point function for wireless communication, the communication apparatus includes a storage unit configured to store, in a connection history, a terminal wirelessly connected to the communication apparatus executing the access point function, a determination unit configured to determine, in a case where the communication apparatus receives an instruction to permit a new terminal to wirelessly connect to the communication apparatus and a wireless connection request is issued to the communication apparatus executing the access point function, whether a request source terminal is stored in the connection history, and a control unit configured to permit, in a case where the determination unit determines that the request source terminal is not stored in the connection history, the request source terminal to wirelessly connect to the communication apparatus, and to inhibit, in a case where the determination unit determines that the request source terminal is stored in the connection history, the request source terminal to wirelessly connect to the communication apparatus.

Further features will become apparent from the following description of exemplary embodiments with reference to the attached drawings.

DESCRIPTION OF THE EMBODIMENTS

Exemplary embodiments will be described below with reference to the drawings.

An image forming apparatus 100 includes an access point function (hereinafter referred to as an AP function) operated by the image forming apparatus 100 as a base unit for wireless communication. The image forming apparatus 100 is an example of a communication apparatus including an AP function. Any communication apparatus, such as a digital camera or a smartphone, including an AP function is applicable.

Figure 1A:
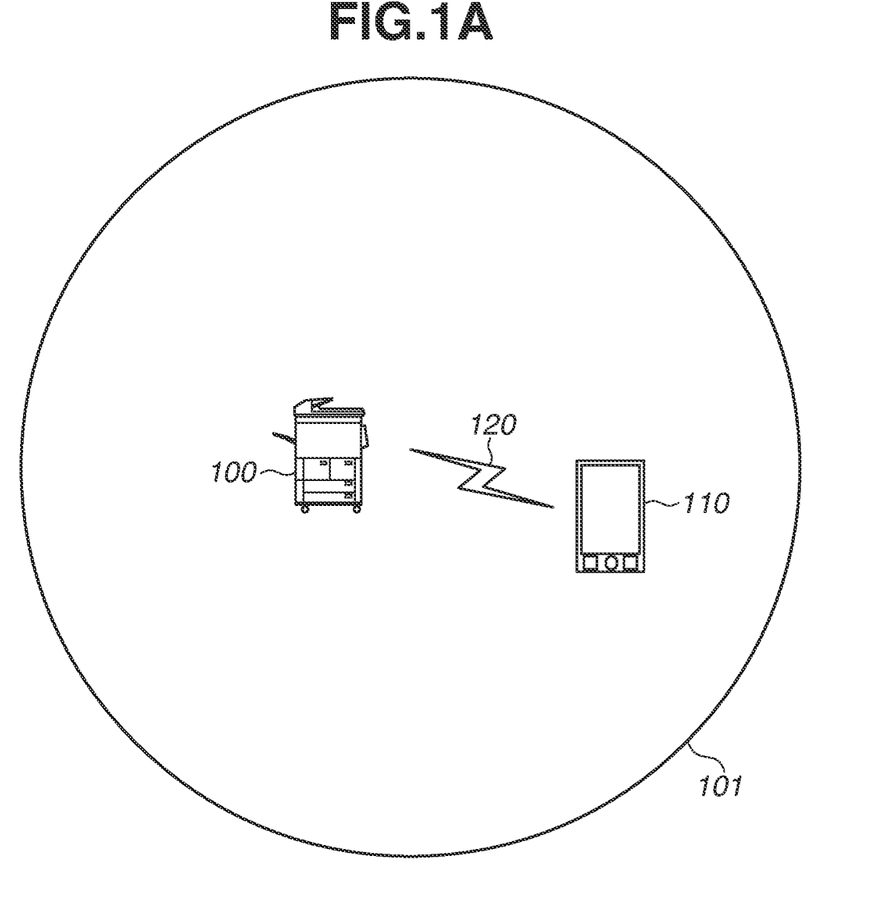
FIGS. 1A and 1B are diagrams each illustrating a connection state between an image forming apparatus and a portable terminal.

FIG. 1A is a diagram illustrating a state where a portable terminal 110 serving as an external apparatus connects to a wireless network established by the AP function of the image forming apparatus 100. A range indicated by a circle 101 is a range in which the AP function of the image forming apparatus 100 can be used. Generally, a terminal within a radius of approximately 100 meters to an access point can perform wireless communication with the image forming apparatus 100 using the wireless network. The image forming apparatus 100 provides the wireless network using the AP function, and, in a case where the portable terminal 110 exists within a range of a radio wave of the wireless network, can establish network-connection to the portable terminal 110 via a wireless local area network (LAN) 120.

Figure 1B:
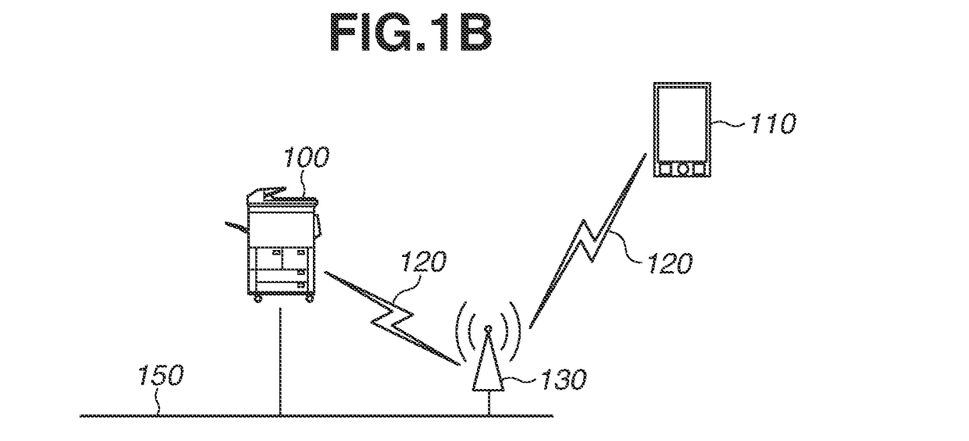

FIG. 1B is a diagram illustrating a state where the image forming apparatus 100 and the portable terminal 110 establish network-connection to each other by a station function (hereinafter referred to as an STA function) of the wireless LAN 120 of the image forming apparatus 100. The image forming apparatus 100 connects to the portable terminal 110 via a wireless access point 130, where the image forming apparatus 100 connects to the wireless access point 130 either via a wired LAN 150 and/or via the wireless LAN 120 provided by the wireless access point 130. The portable terminal 110 connects to the image forming apparatus 100 via the wireless LAN 120 provided by the wireless access point 130. The image forming apparatus 100 according to the present exemplary embodiment can simultaneously use the wired LAN 150 and the wireless LAN 120. Alternatively, the image forming apparatus 100 is configured such that either one of network interfaces is effective.

Figure 2A:
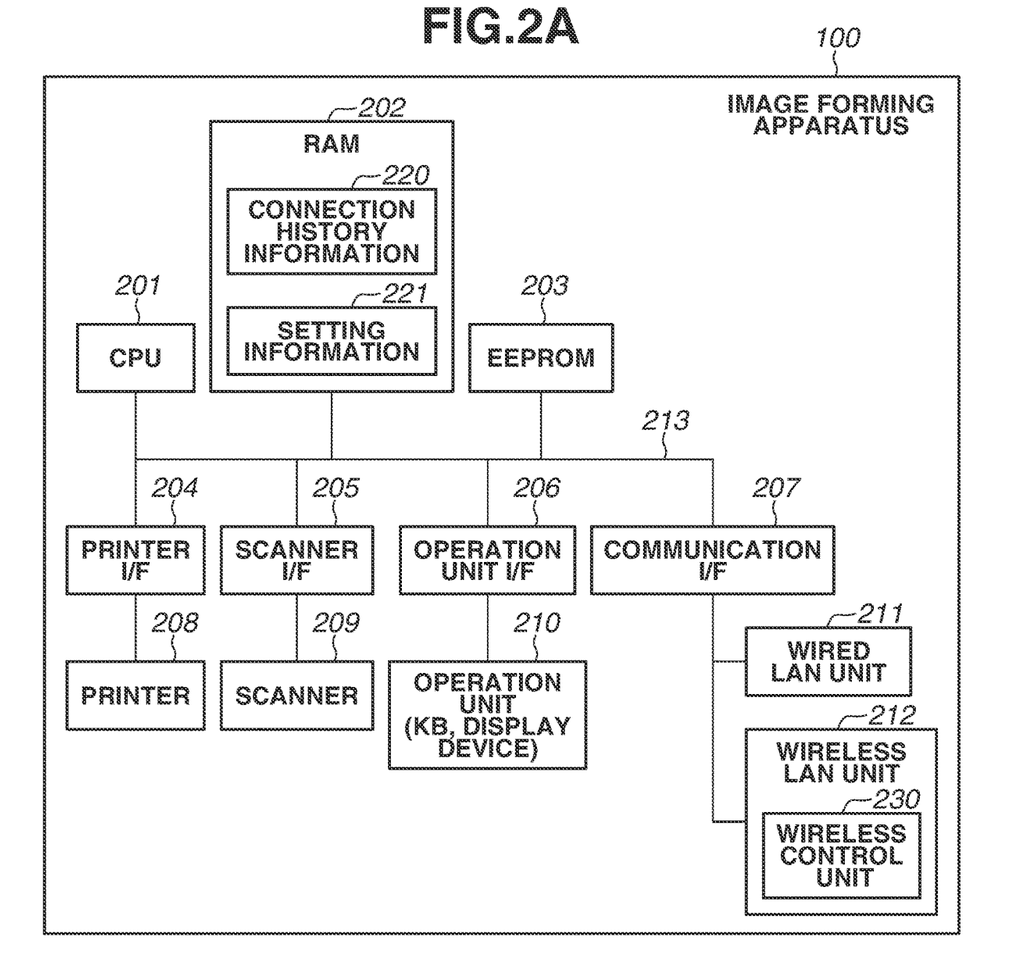
FIG. 2A is a diagram illustrating an image forming apparatus.

FIG. 2A is a diagram illustrating a hardware configuration of the image forming apparatus 100. The image forming apparatus 100 includes a central processing unit (CPU) 201, a random access memory (RAM) 202, an electrically erasable programmable read-only memory (EEPROM) 203, a printer interface (I/F) 204, a scanner I/F 205, an operation unit I/F 206, a communication I/F 207, and is configured to transmit and receive data via a system bus 213. The image forming apparatus 100 also includes Network Interface Controllers (NICs), for example, a printer 208, a scanner 209, an operation unit 210, a wired LAN unit 211, and a wireless LAN unit 212.

The CPU 201 controls operation of the image forming apparatus 100. The CPU 201 controls devices connected to the system bus 213 according to a program stored in the EEPROM 203. The RAM 202 functions as a main memory and a work area of the CPU 201, and is also used as an image information storage area. The EEPROM 203 stores various types of fonts to be displayed on a display device of the operation unit 210, a control program and the like to be executed by the CPU 201, and various types of data. Processing performed by the CPU 201, described below, is implemented when the CPU 201 reads out the program stored in the EEPROM 203 or the like and executes the read program.

In the present exemplary embodiment, the RAM 202 stores connection history information 220 and setting information 221. The connection history information 220 is information indicating past connection histories by the wireless LAN unit 212. The setting information 221 is information indicating a setting of the wireless LAN 120 or the like set by a user. The connection history information 220 and the setting information 221 are copied to the EEPROM 203, as needed, and are restorable even if power to the image forming apparatus 100 is turned off.

The printer I/F 204 controls an interface with the printer 208 serving as a printer engine. The printer 208 performs printing on recording media. The scanner I/F 205 controls an interface with the scanner 209 serving as a scanner engine. The scanner 209 reads a document placed on the image forming apparatus 100, and generates a document image. The operation unit I/F 206 controls an interface with the operation unit 210 for executing various types of settings of the image forming apparatus 100. The communication I/F 207 controls communication of the NICs, such as the wired LAN unit 211 and the wireless LAN unit 212. The wired LAN unit 211 and the wireless LAN unit 212 control transmission and reception of data to and from the portable terminal 110 via the wired LAN 150 and the wireless LAN 120. The wireless LAN unit 212 includes a wireless control unit 230. The wireless control unit 230 is a CPU, a chip, or the like, and controls the wireless LAN unit 212.

Figure 2B:
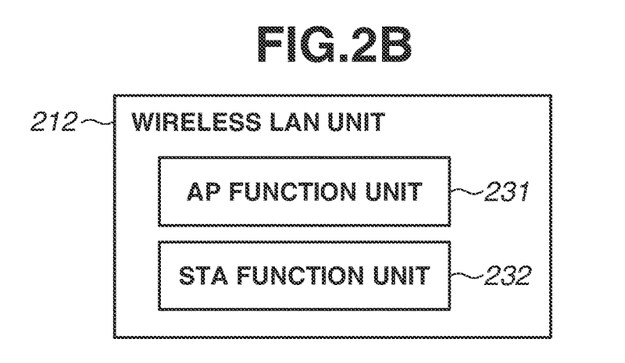
FIG. 2B is a diagram illustrating a software configuration of a wireless local area network (LAN) unit.

FIG. 2B is a diagram illustrating a software configuration of the wireless LAN unit 212. The wireless LAN unit 212 includes an AP function unit 231 and an STA function unit 232. The AP function unit 231 controls an AP function serving as the access point. The STA function unit 232 controls an STA function for connecting to the access point. While the wireless LAN unit 212 operates using either the AP function or the STA function in the present exemplary embodiment, these functions are not seen to be limiting.

Figure 3:
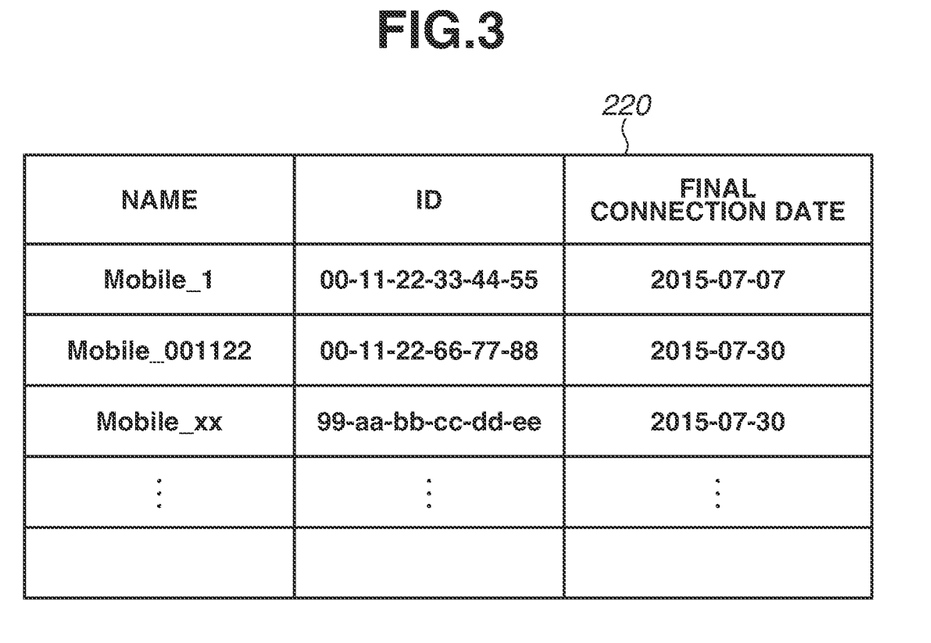
FIG. 3 is a table illustrating an example of a data structure of connection history information.

FIG. 3 is a table illustrating an example of a data structure of the connection history information 220. The connection history information 220 is updated or added by the CPU 201 according to an instruction from the wireless control unit 230 every time the portable terminal 110 is connected to a network established by the wireless LAN unit 212. The processing is an example of history management processing for storing a connection history. The connection history information 220 includes a plurality of pieces of connection information. Each row in the table illustrated in FIG. 3 corresponds to a piece of connection information (record). In each piece of connection information, a name, an identifier (ID), and a final connection date are recorded in such a manner that they are associated with one another.

The name is a name of a portable terminal as a connection partner. In the present exemplary embodiment, a Domain Name Server (DNS) host name set by a Request For Comment (RFC) 1035 of a technical document issued by an Internet Engineering Task Force (IETF) is registered as an initial value of the name. The ID is identification information about a portable terminal as the connection partner. Unique identification information that uniquely specifies a portable terminal, such as a Media Access Control (MAC) address, is registered as the ID. The MAC address is acquired from IEEE 802.11 (a wireless LAN-related standard developed by The Institute of Electrical and Electronics Engineers (IEEE)).

The final connection date is a latest date on which a connection to a portable terminal as the connection partner has been made. In the present exemplary embodiment, the date on which an Internet Protocol (IP) address has been allocated to a portable terminal to which the wireless control unit 230 has connected is registered as the final connection date. The name, the ID, and the final connection date are just examples, and are not seen to be limiting.

Figure 4:
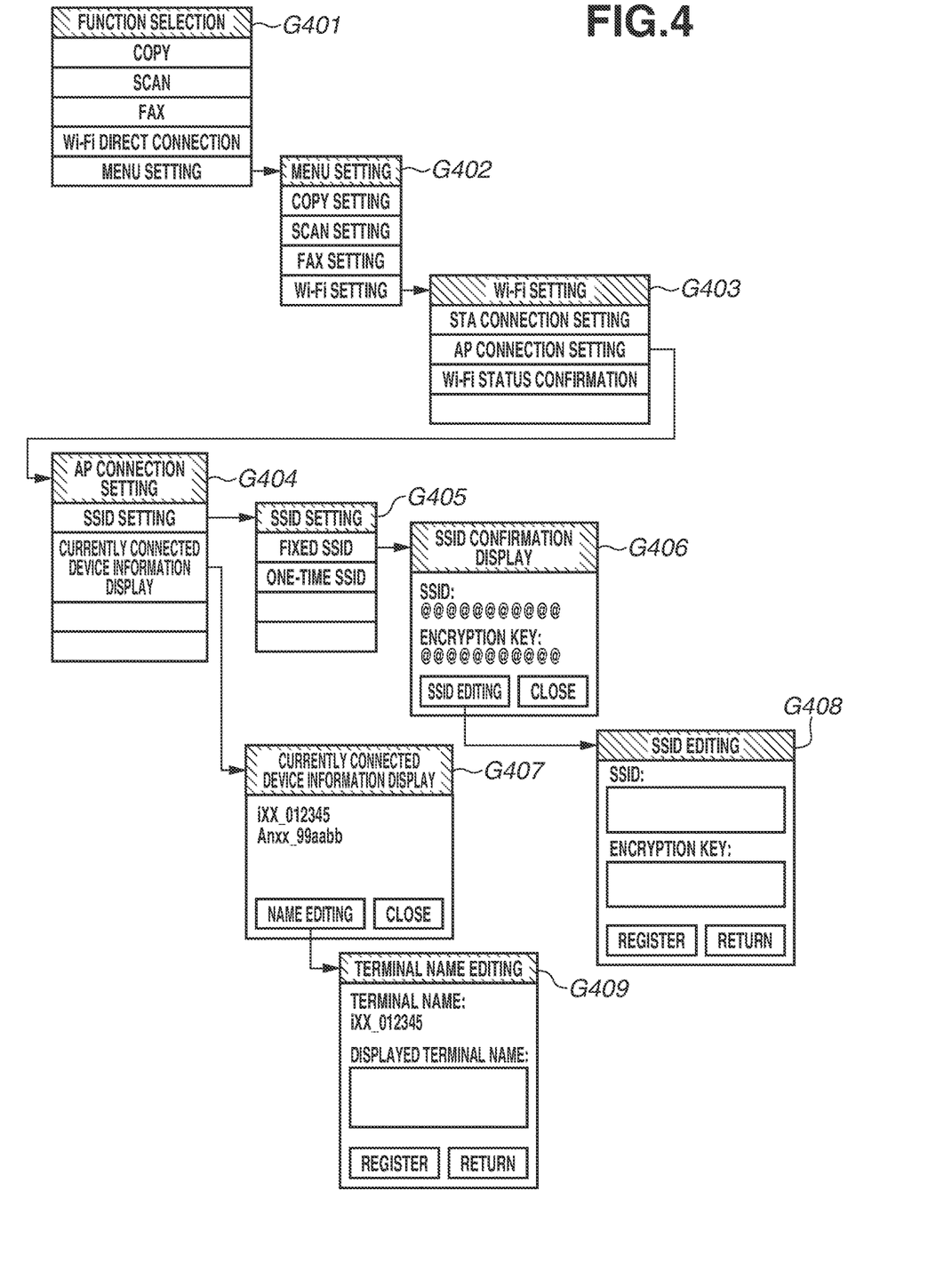
FIG. 4 is a diagram illustrating a screen transition.

FIG. 4 is a diagram illustrating a screen transition for setting and updating the connection history information 220 and the setting information 221. First, the CPU 201 in the image forming apparatus 100 controls the operation unit I/F 206, and displays a function selection screen G401 on the display device of the operation unit 210. To make a Wireless Fidelity (Wi-Fi®) setting, the user selects a "menu setting" on the function selection screen G401, and selects a "Wi-Fi® setting" on a menu setting screen G402 subsequently displayed. Thus, a Wi-Fi® setting screen G403 is displayed.

On the Wi-Fi® setting screen G403, the user can select any one of a "STA connection setting", an "AP connection setting", and a "Wi-Fi® status confirmation". When the "STA connection setting" is selected, the display screen changes to a setting screen for various types of settings relating to the STA function of the wireless LAN unit 212. When the "AP connection setting" is selected, the display screen changes to a setting screen for various types of settings required for the AP function of the wireless LAN unit 212. When the "Wi-Fi® status confirmation" is selected, the display screen changes to a Wi-Fi® status confirmation screen.

When the "AP connection setting" is selected on the Wi-Fi® setting screen G403, the CPU 201 displays an AP connection setting screen G404. On the AP connection setting screen G404, various types of settings relating to the AP function of the wireless LAN 120 can be made. In the present exemplary embodiment, a list of information about devices being connected can be checked using an "SSID setting" and the AP function. When the "STA connection setting" is selected on the Wi-Fi® setting screen G403, the CPU 201 displays an STA connection setting screen. On the STA connection setting screen, various types of settings relating to the STA function of the wireless LAN 120 can be made.

When the "SSID setting" is selected on the AP connection setting screen G404, the CPU 201 changes the display screen to an SSID setting screen G405. On the SSID setting screen G405, handling of an SSID required for a wireless LAN connection can be set. On the SSID setting screen G405, if the same SSID value is used every time when a wireless access point function is provided, the user can select "fixed SSID". If the "fixed SSID" is selected on the SSID setting screen G405, the SSID and an encryption key can be confirmed in an SSID confirmation display screen G406. If an SSID editing button is operated on the SSID confirmation display screen G406, the SSID and the encryption key can be edited in an SSID editing screen G408. If a register button is operated on the SSID editing screen G408, the SSID and the encryption key input on the SSID editing screen G408 are stored in the setting information 221 in the RAM 202.

If a "currently connected device information display" is selected on the AP connection setting screen G404, a list of information about devices being connected using the AP function can be checked in a currently connected device information display screen G407. The CPU 201 can edit a terminal name to be displayed as a connection terminal history on a terminal name editing screen G409 in response to a user operation of a name editing button on the currently connected device information display screen G407. If a register button is operated on the terminal name editing screen G409, the CPU 201 edits (updates) corresponding information in the connection history information 220 in the RAM 202, according to the terminal name input on the terminal name editing screen G409.

Figure 5:
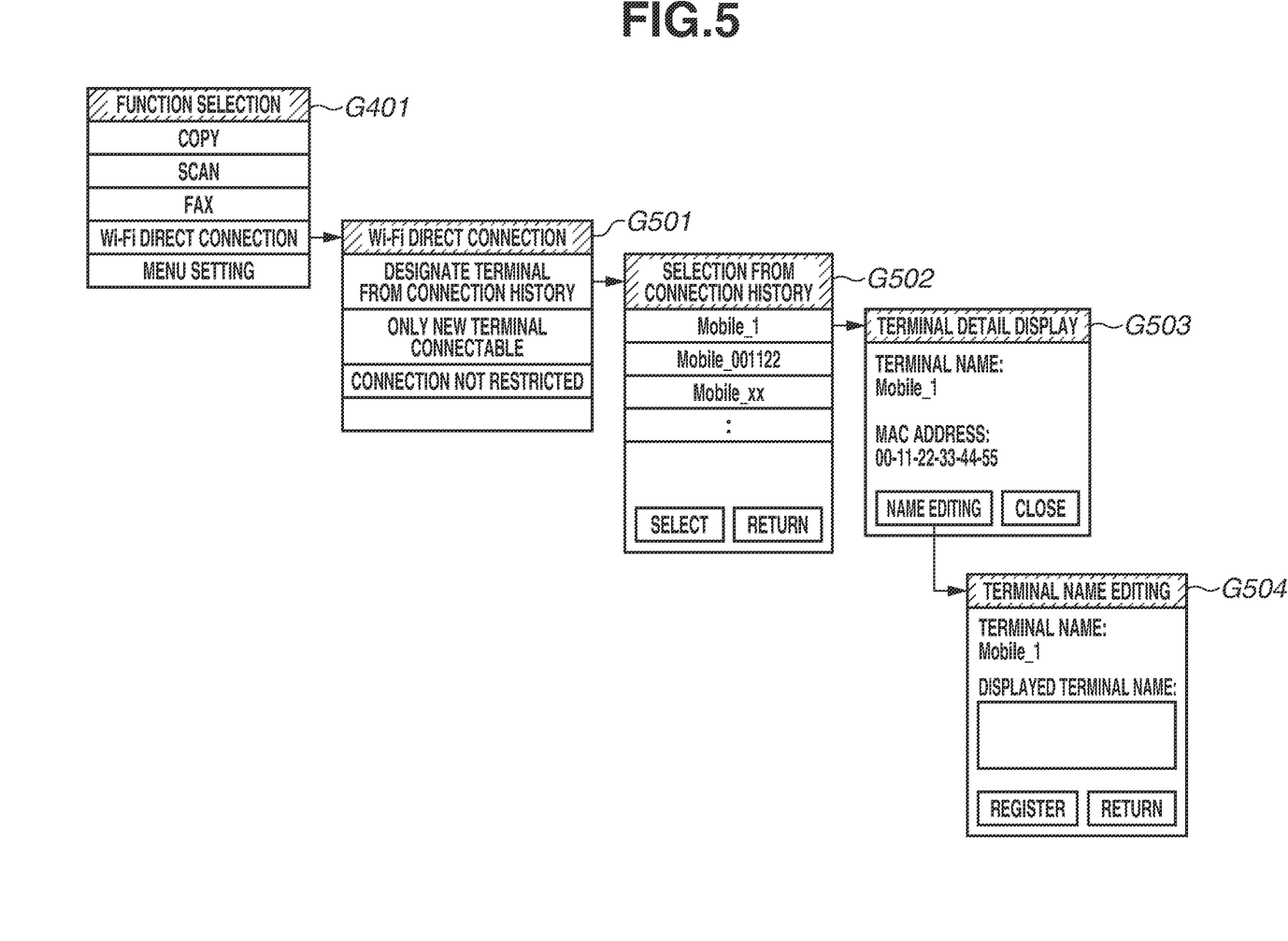
FIG. 5 is a diagram illustrating a screen transition.

FIG. 5 is a diagram illustrating a screen transition of when the "fixed SSID" is selected on the SSID setting screen G405 illustrated in FIG. 4. The CPU 201 displays the function selection screen G401 on the display device of the operation unit 210. To start up the AP function unit 231, the user operates a "Wi-Fi® direct connection".

When the "Wi-Fi® direct connection" is selected, the CPU 201 displays a Wi-Fi® direct connection screen G501. The Wi-Fi® direct connection screen G501 is an example of a setting screen on which the user can select a setting of a connection destination. On the Wi-Fi® direct connection screen G501, "designate terminal from connection history", "only new terminal connectable", and "connection not restricted" can be selected. When the "designate terminal from connection history" is selected, the display screen changes to a screen on which a terminal is designated from among portable terminals recorded in the connection history information 220, i.e., portable terminals that have previously been connected. When the "only new terminal connectable" is selected, a setting with which only a terminal not recorded in the connection history information 220 is permitted to be connected is made. When the "connection not restricted" is selected, a setting not to restrict a connection terminal is made.

If the "designate terminal from connection history" is selected on the Wi-Fi® direct connection screen G501, the CPU 201 displays information stored in the connection history information 220 as a list format on a selection from connection history screen G502. The user can designate a portable terminal, which is desired to be connected to the image forming apparatus 100, using a selection button on the selection from connection history screen G502. If an operation for confirming details of a terminal is performed on the selection from connection history screen G502, the CPU 201 displays a terminal detail display screen G503.

In the present exemplary embodiment, the name in the connection history information 220 can be edited on the terminal detail display screen G503. If the user operates a name editing button on the terminal detail display screen G503, the CPU 201 displays a terminal name editing screen G504. When a register button is operated, the CPU 201 changes the name in the connection history information 220, like on the terminal name editing screen G409.

Figure 6:
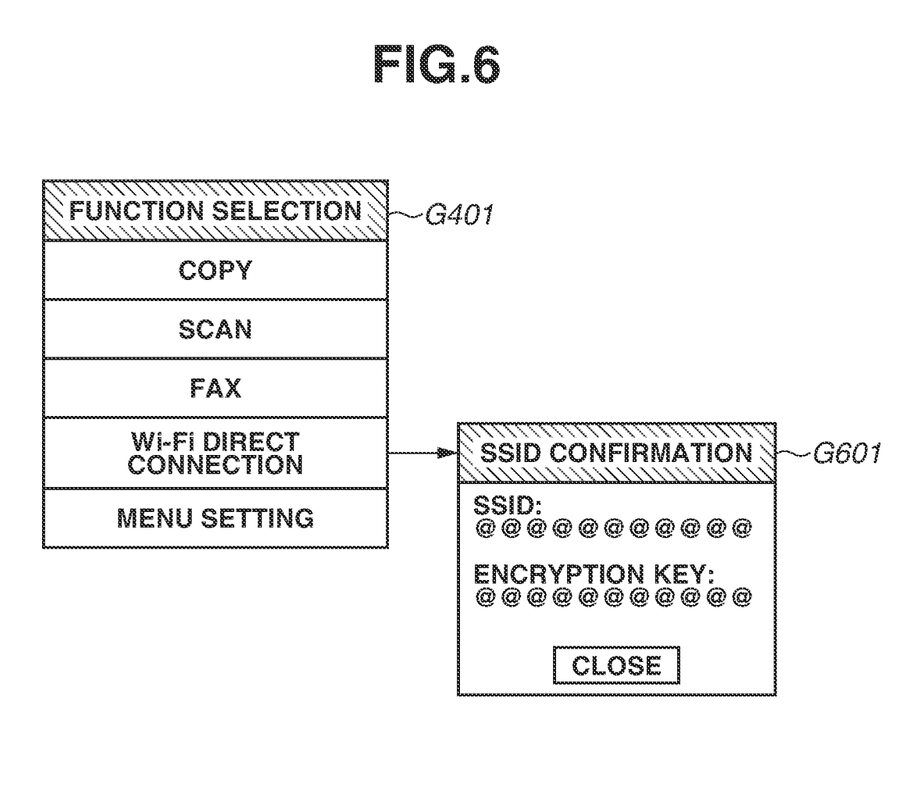
FIG. 6 is a diagram illustrating a screen transition.

FIG. 6 is a diagram illustrating a screen transition occurring when a "one-time SSID" is selected on the SSID setting screen G405 illustrated in FIG. 4. The CPU 201 in the image forming apparatus 100 displays the function selection screen G401 on the display device of the operation unit 210. To start up the AP function unit 231, the user operates a "Wi-Fi® direct connection".

When the "Wi-Fi® direct connection" is selected, the CPU 201 instructs the wireless control unit 230 in the wireless LAN unit 212 to issue the "one-time SSID", and displays information about the "one-time SSID" issued by the wireless control unit 230 on an SSID confirmation screen G601. A portable terminal that is desired to be connected to the image forming apparatus 100 can join (participate in) a wireless network environment established by the AP function of the wireless LAN unit 212 in a manner such that a Wi-Fi® connection condition of the portable terminal is changed and set to a content displayed on the SSID confirmation screen G601.

Figure 7:
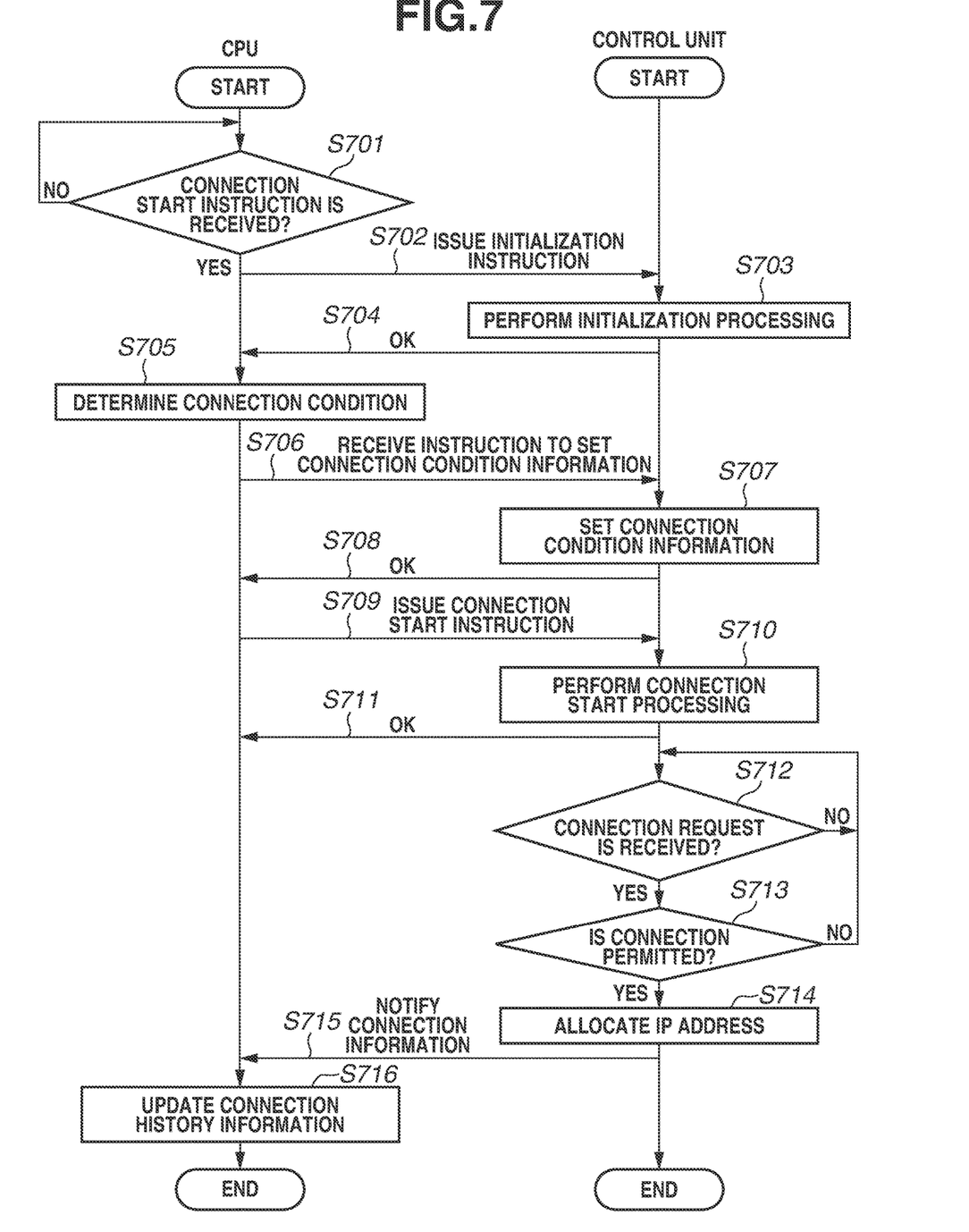
FIG. 7 is a sequence diagram illustrating processing by a central processing unit (CPU) and a wireless control unit.

FIG. 7 is a sequence diagram illustrating processing by the CPU 201 and the wireless control unit 230, in the wireless LAN unit 212, of the image forming apparatus 100. In step S701, the CPU 201 waits until it receives a connection start instruction in response to a user operation. The CPU 201 receives, for example, in a state in which the "fixed SSID" is selected on the SSID setting screen G405, the connection start instruction when the "designate terminal from connection history", the "only new terminal connectable", or the "connection not restricted" is selected on the Wi-Fi® direct connection screen G501. The CPU 201 also receives, in a state in which the "one-time SSID" is selected on the SSID setting screen G405, the connection start instruction when the "Wi-Fi® direct connection" is selected on the function selection screen G401.

If the CPU 201 receives the connection start instruction (YES in step S701), the processing proceeds to step S702. In step S702, the CPU 201 instructs the wireless control unit 230 to perform initialization via the communication I/F 207. Upon receipt of the initialization instruction in step S702, in step S703, the wireless control unit 230 performs initialization processing of the AP function. In this process, the AP function unit 231 establishes a wireless network under the control of the wireless control unit 230. In the present exemplary embodiment, the STA function and the AP function are unconditionally switched. More specifically, even if the STA function is operating, a wireless network is forced to be established by the initialization processing of the AP function. As another example, the STA function and the AP function can operate simultaneously.

In step S704, the wireless control unit 230 returns an OK response indicating completion of the initialization to the CPU 201 as a response to the initialization instruction. Upon receipt of the OK response, in step S705, the CPU 201 determines a connection condition. In step S706, the CPU 201 instructs the wireless control unit 230 to set connection condition information about the connection condition that is determined in step S705.

Figure 8:
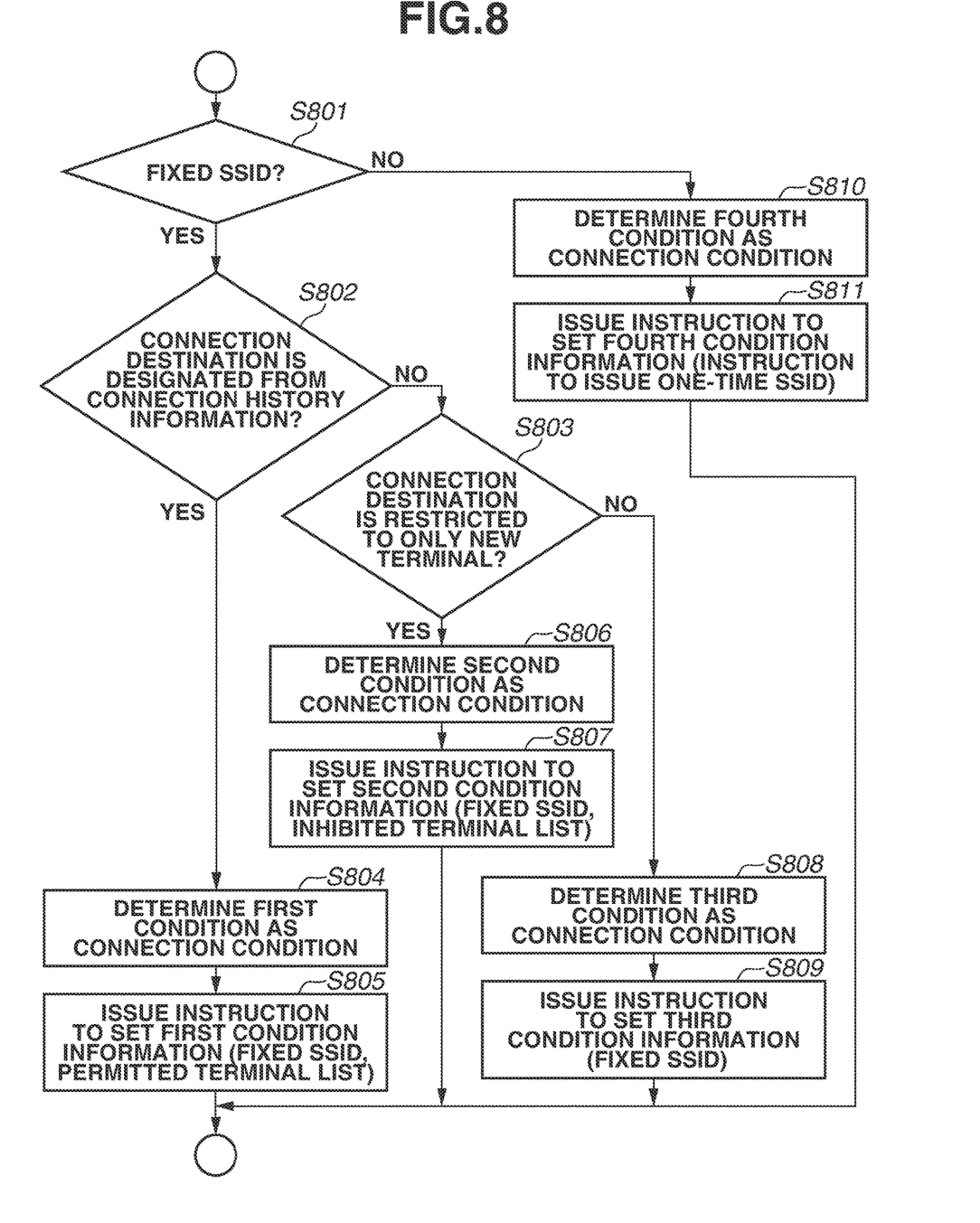
FIG. 8 is a flowchart illustrating processing by the CPU.

FIG. 8 is a flowchart illustrating the processes of the CPU 201 in steps S705 and S706. In step S801, the CPU 201 checks whether the "fixed SSID" or the "one-time SSID" is set on the SSID setting screen G405. In a case where the CPU 201 determines that the "fixed SSID" is set (YES in step S801), the processing proceeds to step S802. In a case where the CPU 201 determines that the "one-time SSID" is set (NO in step S801), the processing proceeds to step S810.

In step S802, the CPU 201 checks whether the connection destination is designated from the connection history information 220. In a case where, on the selection from connection history screen G502, a portable terminal is selected using the selection button, the CPU 201 determines that the connection destination is designated from the connection history information 220. In a case where, on the selection from connection history screen G502, a portable terminal is not selected, the CPU 201 determines that the connection destination is not designated from the connection history information 220. In a case where the CPU 201 determines that the connection destination is designated from the connection history information 220 (YES in step S802), the processing proceeds to step S804. In a case where the CPU 201 determines that the connection destination is not designated from the connection history information 220 (NO in step S802), the processing proceeds to step S803.

In step S803, the CPU 201 checks whether designation in which the connection destination is restricted to only a new terminal is set. In a case where the "only new terminal connectable" is selected on the Wi-Fi® direct connection screen G501, the CPU 201 determines that designation in which the connection destination is restricted to only a new terminal is set. In a case where the "only new terminal connectable" is not selected, the CPU 201 determines that the designation in which the connection destination is restricted to only a new terminal is not set. In a case where the CPU 201 determines that the designation in which the connection destination is restricted to only a new terminal is set (YES in step S803), the processing proceeds to step S806. In a case where the CPU 201 confirms that the designation in which the connection destination is restricted to only a new terminal is not set (NO in step S803), the processing proceeds to step S808.

In step S804, the CPU 201 determines a first condition as the connection condition. The first condition is that a fixed SSID is set and just a connection of a permitted terminal is permitted. The permitted terminal is a portable terminal selected by the user on the selection from connection history screen G502. In step S805, the CPU 201 instructs the wireless control unit 230 to set first condition information as the connection condition information. The first condition information is information indicating that a fixed SSID is set and just a connection of a permitted terminal is permitted. The first condition information includes a permitted terminal list having IDs of permitted terminals.

In step S806, the CPU 201 determines a second condition as the connection condition. The second condition is that a fixed SSID is set and just a connection of a new terminal is permitted. The new terminal is a portable terminal not recorded in the connection history information 220. In step S807, the CPU 201 instructs the wireless control unit 230 to set second condition information as the connection condition information. The second condition information is information indicating that a fixed SSID is set and just a connection of a new terminal is permitted. The second condition information includes an inhibited terminal list having IDs of inhibited terminals. The inhibited terminals are the portable terminals listed in the connection history information 220.

Thus, the wireless control unit 230 can consider a portable terminal other than the portable terminals listed, i.e., an external apparatus other than listed external apparatuses, in the connection history information 220 as a new terminal.

In step S808, the CPU 201 determines a third condition as the connection condition. The third condition is that a fixed SSID" is set and a connection terminal is not restricted. In step S809, the CPU 201 instructs the wireless control unit 230 to set third condition information serving as the connection condition information. The third condition information is information indicating that a fixed SSID is set and a connection terminal is restricted.

In step S810, the CPU 201 determines a fourth condition as the connection condition. The fourth condition is that a "one-time SSID" is used and a connection terminal is not restricted. In step S811, the CPU 201 instructs the wireless control unit 230 to set fourth condition information serving as the connection condition information. The fourth condition information is information including information for instructing issuance of a "one-time SSID" and information indicating that a connection terminal is not restricted.

The processing in steps S801 to S804, S806, S808, and S810 illustrated in FIG. 8 correspond to the process in step S705. The processing in steps S805, S807, S809, and S811 correspond to the process in step S706.

Referring to FIG. 7 again, in step S706, the wireless control unit 230 receives the instruction to set the connection condition information. In step S707, the wireless control unit 230 sets the connection condition information according to the setting instruction. In step S708, the wireless control unit 230 returns an OK response indicating that the connection condition information is set to the CPU 201. Upon receipt of the OK response in step S708, in step S709, the CPU 201 instructs the wireless control unit 230 to start a terminal connection to the wireless network, which is established in step S703. Upon receipt of the instruction, in step S710, the wireless control unit 230 performs connection start processing. More specifically, the wireless control unit 230 instructs the AP function unit 231 to start the terminal connection. In step S711, the wireless control unit 230 returns an OK response indicating that the start instruction is issued to the CPU 201.

In step S712, the wireless control unit 230 waits until the wireless control unit 230 receives a connection request from a portable terminal, and determines whether the connection request to the wireless network established by the AP function unit 231 is received. In a case where the wireless control unit 230 determines that the connection request to the wireless network has been received (YES in step S712), the processing proceeds to step S713. In step S713, the wireless control unit 230 refers to the connection condition information, and determines whether a wireless connection of the portable terminal as a request source of the connection request is permitted. In a case where the wireless control unit 230 determines that the wireless connection is permitted (YES in step S713), the processing proceeds to step S714. In a case where the wireless control unit 230 determines that the wireless connection is not permitted, i.e., is rejected (NO in step S713), the processing returns to step S712. In step S714, the wireless control unit 230 allocates an IP address to the portable terminal as the request source of the connection request. Thus, data communication between the image forming apparatus 100 and the portable terminal becomes possible.

In step S715, the wireless control unit 230 notifies the CPU 201 of connection information. The connection information is information about a connection to a portable terminal, and includes an MAC address, an ID, etc. Upon receipt of the connection information, in step S716, the CPU 201 updates the connection history information 220 based on the connection information.

Figure 9:
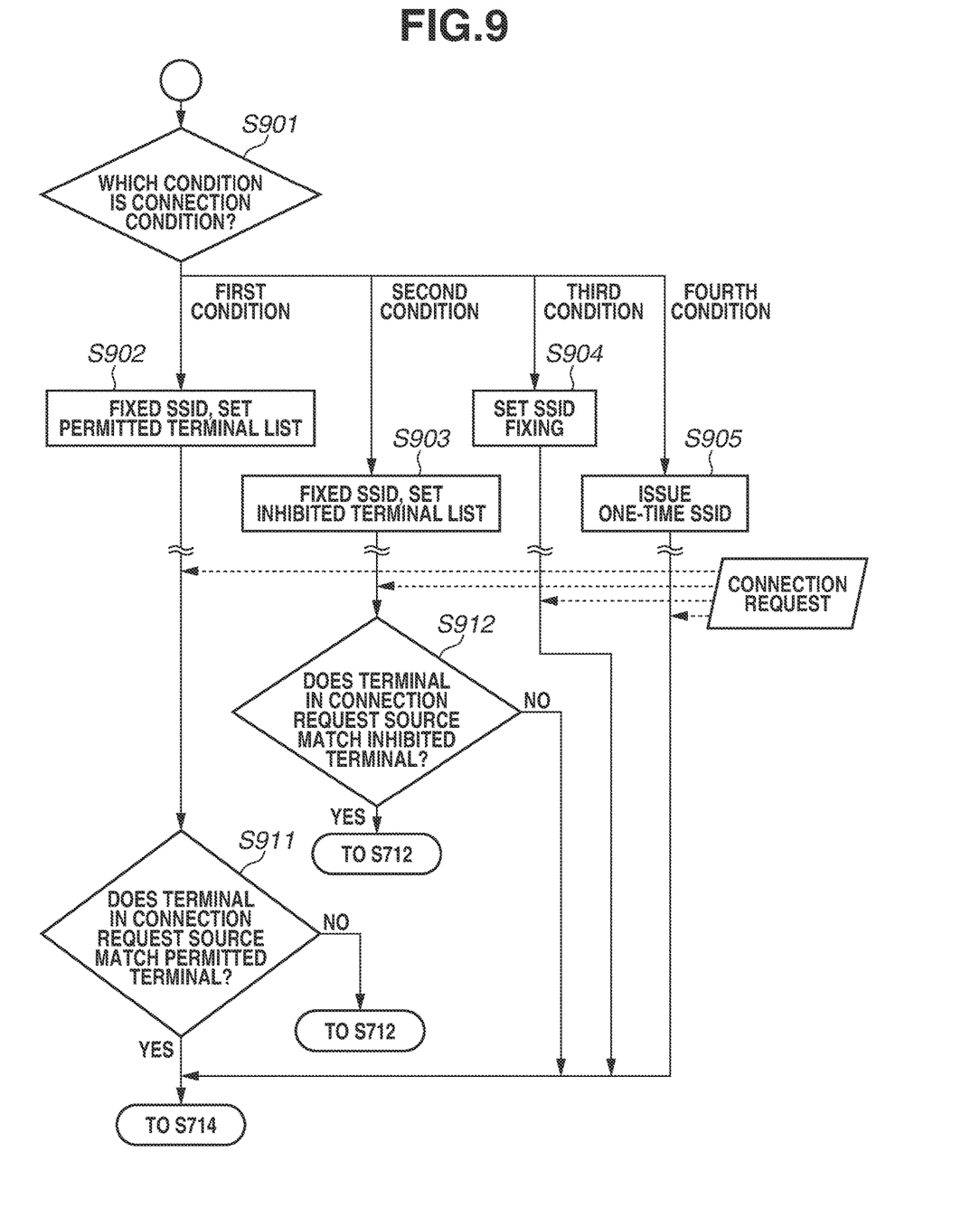
FIG. 9 is a flowchart illustrating processing by the wireless control unit.

FIG. 9 is a flowchart illustrating processes in steps S707 and S713 performed by the wireless control unit 230. In step S901, the wireless control unit 230 checks a connection condition relating to a setting instruction. In a case where the wireless control unit 230 determines that the first condition (FIRST CONDITION in step S901) is set as the connection condition, the processing proceeds to step S902. In a case where the wireless control unit 230 determines that the second condition (SECOND CONDITION in step S901) is set as the connection condition, the processing proceeds to step S903. In a case where the wireless control unit 230 determines that the third condition (THIRD CONDITION in step S901) is set as the connection condition, the processing proceeds to step S904. In a case where the wireless control unit 230 determines that the fourth condition (fourth condition in step S901) is set as the connection condition, the processing proceeds to step S905.

In step S902, the wireless control unit 230 sets the SSID setting to the fixed SSID, and sets a permitted terminal list. In step S903, the wireless control unit 230 sets the SSID setting to the fixed SSID, and sets an inhibited terminal list. In step S904, the wireless control unit 230 sets the SSID setting to the fixed SSID. In the third condition, a portable terminal is not restricted. In step S905, the wireless control unit 230 issues and sets a one-time SSID. The wireless control unit 230 can also notify the CPU 201 of the issued "one-time SSID", and the CPU 201 can perform control to display the "one-time SSID" on the display device. Also in the fourth condition, a portable terminal is not restricted. Processing in steps S901 to S905 correspond to the process in step S707.

When the processing proceeds, and the wireless control unit 230 receives the connection request in step S712, in a case where the first condition is set as the connection condition, in step S911, the wireless control unit 230 confirms whether the portable terminal as the request source of the connection request matches any permitted terminals based on the permitted terminal list. In a case where the portable terminal and a permitted terminal match each other (YES in step S911), the wireless control unit 230 determines that the connection is permitted (YES in step S713), and the processing proceeds to step S714. In a case where the portable terminal and a permitted terminal do not match each other (NO in step S911), the wireless control unit 230 determines that the connection is not permitted (NO in step S713), and the processing proceeds to step S712.

In a case where the second condition is set as the connection condition, in step S912, the wireless control unit 230 confirms whether the portable terminal as the request source of the connection request matches any inhibited terminals based on the inhibited terminal list. In a case where the portable terminal and an inhibited terminal match each other (YES in step S912), the wireless control unit 230 determines that the connection is not permitted (NO in step S713), and the processing proceeds to step S712. In a case where the portable terminal and an inhibited terminal do not match each other (NO in step S912), the wireless control unit 230 determines that the connection is permitted because the terminal is determined as a new terminal (YES in step S713), and the processing proceeds to step S714.

If the third condition and the fourth condition are set as the connection condition, the connectable portable terminal is not restricted. Therefore, the wireless control unit 230 determines that the connection is permitted (YES in step S713), and the processing proceeds to step S714. Processing in steps S713 and S714 are an example of communication control processing for controlling a wireless connection from the external apparatus to the image forming apparatus 100 based on a list of IDs of portable terminals serving as external apparatuses.

As described above, in the image forming apparatus 100 according to the present exemplary embodiment, the portable terminal permitted to be connected can be previously designated. This can prevent a situation where, because an unintended portable terminal and the image forming apparatus 100 are wirelessly connected to each other, the portable terminal, which is desired to be connected, and the image forming apparatus 100 cannot wirelessly connect to each other. Thus, the image forming apparatus 100 can appropriately control the connection partner in the wireless connection.

The method for restricting a portable terminal is not limited to that described in the present exemplary embodiment. In another exemplary embodiment, the image forming apparatus 100 can, for example, be set to permit a wireless connection to all portable terminals listed in connection history information. In still yet another exemplary embodiment, the image forming apparatus 100 can, for example, be set to permit a wireless connection to the portable terminal set by a user and to inhibit a wireless connection to other portable terminals independently of a connection history. In another exemplary embodiment, the image forming apparatus 100, for example, can be set to inhibit a wireless connection to the portable terminal connected by the user and to permit a wireless connection to other portable terminals independently of the connection history.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-009918, filed Jan. 21, 2016, which is hereby incorporated by reference herein in its entirety.

What is claimed is:

1. A communication apparatus that provides an access point, the communication apparatus comprising:
    a display device configured to display information; and
    at least one controller configured to perform:
        adding device information of one external device to a connection history list according to establishing of a connection relation between the access point and the one external device;
        causing the display device to display a screen which includes a device list based on the connection history list and on which it is possible to designate a grant of permission for establishing a further connection relation with the one external device; and
        establishing a connection relation between the access point and the one external device in a case where it is designated to grant the permission after adding the device information of the one external device to the connection history list, and not establishing a connection relation between the access point and the one external device according to inclusion of the device information of the one external device in the connection history list in a case where it is not designated to grant the permission after adding the device information of the one external device to the connection history list, according to receipt of an establishment request for establishing a connection relation with the access point from the one external device;
    wherein the connection history list stores only device information of an external device with which a connection relation is established in a state where a one service set identifier (SSID) is set in the access point.

2. The communication apparatus according to claim 1, wherein if one permission setting of a plurality of permission setting is set, the controller establishes the connection relation between the access point and the one external device in a case where the information coinciding with the device information is not included in the connection history list, and does not establish the connection relation between the access point and the one external device in a case where the information coinciding with the device information is included in the connection history list, according to receipt of the establishment request for establishing a connection relation with the access point from the one external device.

3. The communication apparatus according to claim 2, wherein if a permission setting different from the one permission setting of the plurality of permission setting is set, the controller establishes the connection relation between the access point and the one external device regardless of the connection history list.

4. The communication apparatus according to claim 2, wherein the controller is further configured to perform:
    displaying, on the display device, a screen for designating a permission setting from the plurality of permission settings.

5. The communication apparatus according to claim 1, wherein the communication apparatus is a printing apparatus.

6. The communication apparatus according to claim 1, wherein the device information includes at least either of a name and an identification of the one external device.

7. The communication apparatus according to claim 1, wherein at least a service set identifier (SSID) and key information are used for establishment of the connection relation.

8. A control method for controlling a communication apparatus that includes a display device configured to display information and that provides an access point, the control method comprising:
    adding device information of one external device to a connection history list according to establishing of a connection relation between the access point and the one external device;
    causing the display device to display a screen which includes a device list based on the connection history list and on which it is possible to designate a grant of permission for establishing a further connection relation with the one external device; and
    establishing a connection relation between the access point and the one external device in a case where it is designated to grant the permission after adding the device information of the one external device to the connection history list, and refraining from establishing a connection relation between the access point and the one external device according to inclusion of the device information of the one external device in the connection history list in a case where it is not designated to grant the permission after adding the device information to the connection history list, according to receipt of an establishment request for establishing a connection relation with the access point from the one external device;
    wherein only device information of an external device with which the connection relation is established in a state where a one service set identifier (SSID) is set in the access point is stored in the connection history list.

9. The control method according to claim 8, wherein if a one permission setting of a plurality of permission settings is set, the connection relation between the access point and the one external device is established in a case where the information coinciding with the device information is not included in the connection history list, and the connection relation between the access point and the one external device is not established in a case where the information coinciding with the device information is included in the connection history list, according to receipt of the establishment request for establishing a connection relation with the access point from the one external device.

10. The control method according to claim 9, wherein if a permission setting different from the one permission setting of the plurality of permission settings is set, the connection relation between the access point and the one external device is established regardless of the connection history list.

11. The control method according to claim 9, wherein a screen for designating a permission setting from the plurality of permission settings is displayed on the display device of the communication apparatus.

12. The control method according to claim 8, wherein the communication apparatus is a printing apparatus.

13. The control method according to claim 8, wherein the device information includes at least either of a name and an identification of the one external device.

14. The control method according to claim 8, wherein at least a service set identifier (SSID) and key information are used for establishment of the connection relation.

15. A non-transitory storage medium storing a program for causing a computer to execute a control method for controlling a communication apparatus that includes a display device configured to display information and that provides an access point, the control method comprising:

adding device information of one external device to a connection history list according to establishing of a connection relation between the access point and the one external device;

causing the display device to display a screen which includes a device list based on the connection history list and on which it is possible to designate a grant of permission for establishing a further connection relation with the one external device; and establishing a connection relation between the access point and the one external device in a case where it is designated to grant the permission after adding the device information to the connection history list, and refraining from establishing a connection relation between the access point and the one external device according to inclusion of the device information of the one external device in the connection history list in a case where it is not designated to grant the permission after adding the device information to the connection history list, according to receipt of an establishment request for establishing a connection relation with the access point from the one external device;

wherein only device information of an external device with which the connection relation is established in a state where a one service set identifier (SSID) is set in the access point is stored in the connection history list.

* * * * *